United States Patent Office 3,492,134
Patented Jan. 27, 1970

3,492,134
PROCESS FOR THE PRODUCTION OF TABLETTED MATERIALS FOR USE IN THE SMOKING OF FOOD
Ludwig Brümmendorf, 5523 Waxweiler, Eifel, Germany
Filed Apr. 20, 1966, Ser. No. 543,963
Claims priority, application Germany, Apr. 30, 1965, B 81,693
Int. Cl. A23b 1/04, 3/04
U.S. Cl. 99—229                                4 Claims

ABSTRACT OF THE DISCLOSURE

Material for smoking meats and other foodstuffs is prepared by drying sawdust or finely comminuted woody substances to a moisture content of 7–9% and compressed at pressures of 500 to 8500 kg./cm.$^2$ forming tablets about 5–10 mm. in height and 5–25 mm. in diameter. If desired, spices and other flavoring materials may be admixed with the woody material before tabletting.

---

This invention relates to products consisting of comminuted smoking agents for the smoking of foods, e.g. meat, fish, cheese or the like in the form of tablets formed by compression.

Foods are conventionally smoked by freshly evolved smoke from wood, e.g. wood shavings, sawdust or wood powder. Such smoking agents occupy a large volume, are relatively difficult to handle and require careful storage or attention, e.g. turning over with a shovel, to prevent decay or fermentation.

It is known to use sawdust or wood shavings in the form of briquettes for food smoking purposes. Briquettes of this kind having the same size as standard bricks do not evolve enough smoke and accordingly it has been proposed to employ ducted briquettes to ensure a better supply of oxygen. However even ducted briquettes have proved unsatisfactory, i.e. the smoke evolution did not meet food smoking requirements.

The object of the invention is to provide food smoking materials in the form of tablets formed by compression, to ensure better smoke production, provide easy storage without any special attention and provide a means for charging automatic smoke producers.

According to the present invention, there are provided tablets of comminuted food smoking agents which have been pressed to tablet form under high pressure. According to a further feature of the invention there is provided a process for smoking food which comprises subjecting the food to smoking by means of smoke generated by burning tablets of smoking agents which have been pressed to tablet form under high pressure.

The tablets according to the invention advantageously have a diameter from about 5 to 25 mm.; very good results have been obtained with tablets with diameters from 12 to 15 mm. and with a height of from 5 to 10 mm.

The tablets according to the invention may be pressed from a mixture of wood powder or wood shavings and food smoking spices.

The invention also covers a method of producing tablets consisting of comminuted agents for the smoking of foods, which comprises pressing comminuted food smoking agents to tablet form by means of a tabletting press. The comminuted food smoking agents can be pressed, for example, at pressures of about 1000 to 8500 kg./cm.$^2$, more particularly about 3000 to 6500 kg./cm.$^2$. Lower pressures may be used, e.g. from 50 to 1000 kg./cm.$^2$, more particularly for comminuted highly resinous food smoking agents.

The material for pressing may consist of wood powder or wood shavings of hard wood or softwood or both, together if desired with spices, e.g. comminuted juniper wood or stems, juniper berries or juniper needles. A convenient source is the dried and comminuted residues of Hollands gin distillation. In view of the high pressure used for tabletting, the natural resin or spices content of the food smoking agent is usually enough to ensure adequate cohesion of the tablets. If required, however, binders, e.g. natural resins, may be used or a proportion of a sawdust from a very resinous wood may be included. Where binders are employed the bottom range of the pressures indicated may be used.

The tables according to the invention are advantageously packed in air-tight and moisture-proof containers, e.g. plastic bags, for transportation and storage, such bags preferably being heat-sealed in known manner to exclude any admission of damp air.

The use of tablets according to the invention for the smoking of foods have numerous advantages over the known use of loose sawdust or shavings. Thus:

(1) Tabletting reduces the volume of the smoking agent, e.g. to one-fifth to one-sixth of the original volume. The food smoking agents can thus be transported much more easily and economically.

(2) The space requirements for storing the tablets according to the invention are much reduced, a considerable amount of space is saved as compared with the storage of loose sawdust, and no turning over with a shovel is needed to maintain the quality of the smoking agent and reduce decay.

(3) Tablets according to the invention are homogeneous elements of identical sizes which are thus very suitable for charging automatic smoke producers.

(4) The tablets according to the invention represent a standardised product of uniform composition and uniform moisture content to provide uniform burning and the required uniform smoke evolution. The disadvantages of the known brick-sized briquettes have not been detected with the tablets according to the invention.

The quantities of added spices can be accurately regulated and uniformly distributed in the tablets according to the invention.

The tablets according to the invention may be of cylindrical, hemispherical, spherical, cubic or any other desired shape.

The following examples will serve to illustrate the invention:

EXAMPLE 1

Beech sawdust was sieved and any foreign bodies were removed. The sawdust was dried to a moisture content of 7 to 9%, and then charged in a tabletting press. A heavy duty circular tabletting press was used, in which the material was first precompressed and the included air removed before the pressing operation. The maximum pressure was about 6500 kg./cm.$^2$. Tablets of a diameter of about 13 mm. and a height of 5 mm., 8 mm. and 10 mm. were produced.

The resulting tablets retained their shape and, until required, they were stored in polyethylene bags under airtight and moisture-proof conditions.

When the resulting pressings were used for smoking there was a very uniform smoke evolution and burning. There is an appreciable expansion when the tablets burn in the smoke producer and this assists the access of oxygen.

EXAMPLE 2

Beech sawdust prepared as in Example 1 was mixed with sieved softwood dust, e.g. fir, birch and larch sawdust, the moisture content of which had also been limited to about 7 to 9%. Compositions prepared as required were charged in the tabletting press and all the compositions gave shape-stable tablets. The hardness of the tablets depends particularly on the moisture content of the consituents used. The tablets were packed in polyethylene bags as described in Example 1 and all burnt uniformly and well.

EXAMPLE 3

A mixture of the beech sawdust prepared in accordance with Example 1 and dried and ground residues from Hollands gin distillation was prepared a nd had a moisture content of 7 to 9%. The mixture was tabletted as described in Example 1. The tablets yielded a pleasant smelling smoke when used in a smoke producer.

The invention accordingly provides food smoking agents of exactly regulated and required composition in the form of tablets, which are easy to handle, occupy little space and readily be so packed as to exclude moisture. Accordingly, the tablets according to the invention require no special attention before use. When the tablets according to the invention are used uniform smoke evolution is ensured from the beginning to the end of the food smoking operation so that the quality of the food, e.g. bacon, is constant.

The drawing illustrates, in section, some embodiments of pressings according to the invention (to an enlarged scale).

Figure 1:
FIG. 1 illustrates a cylindrical flat tablet 1 prepared in accordance with Example 1.
Figure 2:
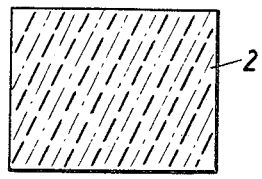
FIG. 2 illustrates a tall cylindrical tablet 2 prepared in accordance with Example 2.
Figure 3:
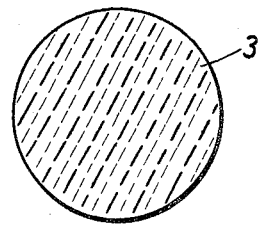
FIG. 3 shows a spherical tablet 3 prepared in accordance with example 3.

I claim as my invention:

1. A process for the production of a combustible smoking agent in tablet form to be used in the smoking of food which comprises drying a comminuted woody smoking agent to a moisture content of 7–9% by weight and then compressing the said dried agent to form a tablet under a pressure of at least 500 kg./cm$^2$.

2. A process according to claim 1 wherein the smoking agent is a mixture of hardwood sawdust and juniper material.

3. A process according to claim 1 wherein the tabletting pressure is in the order of 100 to 8500 kg./cm.$^2$ and the resulting tablet has a diameter of 5 to 25 mm.

4. A process according to claim 3 wherein the pressure is 3000–6500 kg./cm.$^2$.

References Cited

UNITED STATES PATENTS

| | | | |
|---|---|---|---|
| 2,341,377 | 2/1944 | Hinderer | 44—15 |
| 2,611,311 | 9/1952 | Irwin | 99—229 X |
| 3,000,743 | 9/1961 | Tolin | 99—229 X |
| 3,395,026 | 7/1968 | Gregory | 99—229 |

HYMAN LORD, Primary Examiner

U.S. Cl. X.R.

44—10